United States Patent
Bryfors et al.

(10) Patent No.: US 6,535,834 B1
(45) Date of Patent: Mar. 18, 2003

(54) HORIZONTAL REFERENCE MARKER

(75) Inventors: Uno Bryfors, Västerås (SE); Christer Johansson, Västerås (SE)

(73) Assignee: Abb AB, Västerås (SE)

( * ) Notice: Subject to any disclaimer, the term of this patent is extended or adjusted under 35 U.S.C. 154(b) by 0 days.

(21) Appl. No.: 09/806,239

(22) PCT Filed: Sep. 29, 1999

(86) PCT No.: PCT/SE99/01731
§ 371 (c)(1),
(2), (4) Date: Jul. 10, 2001

(87) PCT Pub. No.: WO00/18671
PCT Pub. Date: Apr. 6, 2000

(30) Foreign Application Priority Data

Sep. 30, 1998 (SE) .............................................. 9803341

(51) Int. Cl.⁷ .............................................. B65G 63/00
(52) U.S. Cl. ........................................ 702/158; 73/1.81
(58) Field of Search ........................... 702/158, 94, 95, 702/105, 150–154; 73/1.75, 1.79, 1.81

(56) References Cited

U.S. PATENT DOCUMENTS 3,701,442 A  * 10/1972  Dunning et al. ............ 414/273
3,917,249 A  * 11/1975  Constantine ................. 269/58
5,780,826 A  *  7/1998  Hareyama et al. .......... 235/385

FOREIGN PATENT DOCUMENTS

| DE | 4423797 | 1/1996 |
| EP | 0302569 | 2/1989 |
| EP | 0820957 | 1/1998 |
| FR | 2689488 | 10/1993 |
| GB | 1449488 | 9/1976 |
| GB | 2221212 | 1/1990 |

* cited by examiner

Primary Examiner—Marc S. Hoff
Assistant Examiner—Edward Raymond
(74) Attorney, Agent, or Firm—Dykema Gossett PLLC

(57) ABSTRACT

A horizontal reference marker and method of using the horizontal reference marker to determine the exact position on the ground of a ground slot for a standard freight container. At least two horizontal reference markers are fixed to the ground or any substantially horizontal stacking surface and arranged in a known position relative to a ground slot on the ground. The horizontal reference markers are shaped suitable for detection by laser means mounted on container cranes. The advantage is precise and parallel positioning of a container placed on the ground, which ensures that container stacks have sufficient clearance between them and simplifies container handling.

3 Claims, 2 Drawing Sheets

HORIZONTAL REFERENCE MARKER

TECHNICAL FIELD

The invention relates to a device and method for handling freight containers. In particular it is a device and method for measuring the position of a ground slot on which a container may be placed.

BACKGROUND ART

A vast amount of freight is shipped in standard shipping containers. At each point of transfer from one transport means to another, for example in ports and harbours, there is a tremendous number of containers that must be unloaded, transferred to a temporary stack, and later loaded on to another ship or to another form of transport.

In a place for handling containers, such as a container yard, containers are usually stacked in substantially rectangular groups of stacks. Containers are usually arranged with long axes ordered parallel in substantially parallel rows. The rows are laid out to provide a clearance between containers in each row, and with a clearance between each row of containers. Space in such container yards is at a premium and so the clearance between container rows and containers is required to be minimal. The high running cost of ships requires that containers be moved between ship and stack as rapidly as possible so that a ship may be unloaded, loaded and turned around in the shortest possible time. To achieve the shortest unloading and loading times container handling equipment has to be partly and/or preferably completely automated in normal operation.

The technical demands of handling containers are great. The tare weight of containers is usually consistent, but the gross weight varies considerably. The width of shipping containers is standardised at 8 ft, but the height varies between from 8 and 9.5 ft. The most common standard lengths are 20 ft and 40 ft long. The 40 ft container is very common today and even longer containers up to 53 ft long are also in use. Thus the size of containers varies as well as the weight. With the increase in average length of containers handled it becomes more difficult and more important to place containers accurately in a specified place, known as a ground slot, in the container yard.

A retrieval problem may occur when a stack of containers is placed so that it leans towards or over a lower stack of containers. A horizontal clearance is required for vertical access between two rows of containers. If the horizontal clearance between rows is insufficient, it may not be possible for an automatic lifting device either to sense or to access a container at the top of a stack.

A container may be handled by a crane, a crane moving on rails, a self-propelled container handling apparatus, or a lift or winch of any type all of which are referred to herein as a crane. Each crane has a lifting device usually incorporating a spreader of some kind that directly contacts a container, to grip it, lift it, lower it and release it. In this description the term spreader is used to denote a part of a lifting device that is in direct contact with a container. Spreaders are normally designed to handle more than one size of container, typically 20–40 ft or 20–40–45 ft long containers.

Automatic container handling apparatuses and systems are used to speed up the process of loading and unloading. An example of a mobile system is known from U.S. Pat. No. 5,780,826. A self-propelled container handling apparatus is disclosed which senses an identification code on a container and places the container in a container yard. The self-propelled handling apparatus uses a vertical lifting sensing means to sense vertical distance, and uses two measuring means for sensing horizontal distances. First, a distance measuring means relating the position of the lifting part of the apparatus to the position of the rest of the apparatus and secondly, ground position satellite (GPS) sensing to track the ground position of the handling apparatus itself. However, it is difficult to land containers rapidly and automatically with equipment of this type. It is also difficult to place containers accurately on the ground using a GPS satellite system as the resolution of such a system is usually more suitable for measuring distances of several meters rather than centimeters.

In a container yard each location for a container placed on the ground, a ground slot, is typically defined by lines painted on the ground. The lines painted on the ground are intended to show the position of the size of container for which the ground slot is laid out. If the support surface is designed to support stacks of 20 ft containers then the painted lines usually indicate 20 ft ground slots. It is normally permissible to place a 40 ft container covering two 20 ft ground slots. There may also be ground slots which are laid out to be used by either one 45 ft or one 40 ft or two 20 ft containers.

If the first container placed on the ground slot is not accurately placed, there may not be sufficient clearance to handle containers in adjacent ground slots efficiently and without causing damage to containers. The amount of time lost and the risk of damage to containers increases if additional containers are subsequently stacked on top of a container that has been misplaced on a ground slot.

In addition to horizontal errors of placement in a direction parallel with or perpendicular to the line of the row and the long axis of a container, a container may be skewed. A skew is defined here as an angular displacement of the long axis of the container with respect to the line of the row.

EP 0302 569 describes a storage and trans-shipment system for containers. The system includes a grid of ground positions laid out as a rectangular grid of wires buried in the surface of a yard. The system described includes a method for an independent container carrying vehicle to navigate to a selected ground position, but does not disclose how a position of a container relative to the ground position may be accurately determined.

GB 1 449 488 describes a storage with automatic handling means. The storage yard includes position indicating elements disposed relative to a position of railway cars on a track. Other position indicating elements are placed to indicate a centre point of a ground position. The devices and methods described do not disclose how to determine if a container is accurately aligned relative to a ground position or parallel to an axis of the ground position.

SUMMARY OF THE INVENTION

It is an object of the invention to provide a device and method to measure the horizontal distance between a travelling part of a crane and a ground slot on the ground or on a deck. It is another object of the invention to provide a means and method to measure the horizontal distance between the travelling part of a crane and a ground slot on the ground regardless of length of container. It is another object of the invention to provide a means and method to measure the horizontal distance between the travelling part of a crane and a ground slot on the ground regardless of the direction of approach by the crane with respect to the ground slot. It is a further object of the invention to measure a skew angle between the travelling part of the crane and the ground slot.

These and other objects are realised by a device and method according to the invention. The present invention is a horizontal reference marker placed on the ground arranged relative to, and at a predetermined distance from, the position of a ground slot for a container and a method for measuring the horizontal distance between a travelling part of a crane and the ground slot on the ground for a container. Using known measuring means such as laser arrangements suitably mounted on a travelling part of a crane, the exact location of a ground slot on a horizontal plane can be determined using the present invention.

The main advantage of the present invention is that a container may be lowered accurately onto a ground slot position on the ground or on any other support surface such as a deck or a floor. A ground slot on the ground is used here to describe a stacking target on any substantially horizontal surface such as the ground, a support surface constructed on the ground, a ships deck, a deck or floor inside a building or the loading surface of a vehicle.

The first benefit of the present invention is that a first container accurately placed on the ground means that there would be sufficient clearance between the first container and adjacent containers. This means that the first container, and containers subsequently stacked on top of it may, in the vicinity of containers in adjacent ground slots and stacks, be handled efficiently and without damage to containers.

Another advantage is that a container may be automatically lowered into a precisely measured target position. This offers the important economic benefit of rapid handling of containers, which is extremely important in maintaining low and competitive freight costs. Another advantage with an economic benefit is that clearances between stacks and rows may be kept to a minimum, reducing the area of ground needed for storing containers. A technical advantage of this present invention is that the horizontal position of the container in x, y directions is secured by ground reference marker to a high degree of accuracy. A preferred embodiment includes a method in which skew errors in a horizontal plane are easily measured.

A technical and economic advantage of the device and method is that it may also be used in adverse weather conditions. Despite reduced visibility that would delay or prevent a crane driver from seeing a target position caused by bad weather or poor lighting conditions, for example, the present invention enables the ground position to be accurately determined. The present invention is not limited by direction of approach of a crane towards a ground slot, or by containers of differing lengths. The present invention is very useful in facilitating trade by making container handling fast and keeping costs low. It is also not restricted to shipping ports and may be applied to handling any containerised freight, such as air freight, and containers on and off trains or trucks.

BRIEF DESCRIPTION OF THE DRAWINGS

The present invention will be described in more detail in connection with the enclosed drawings.

DESCRIPTION OF THE PREFERRED EMBODIMENTS

Figure 1:
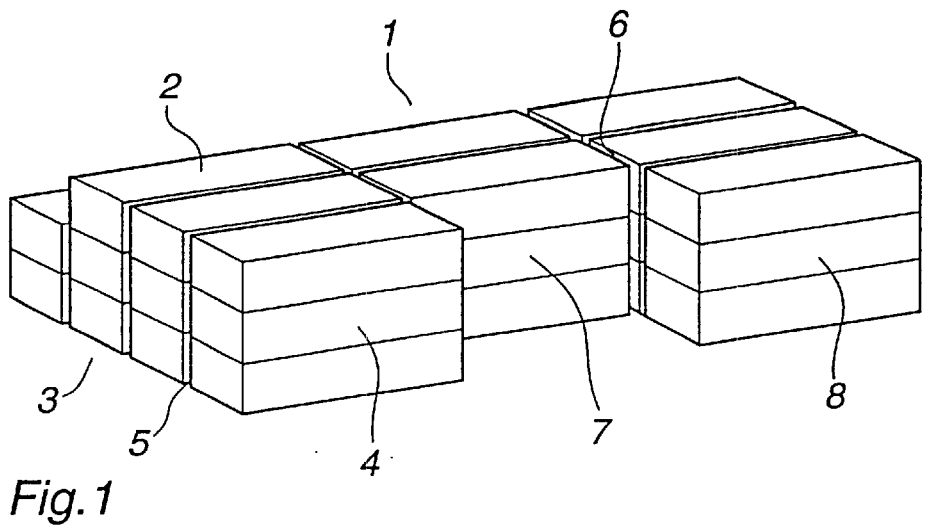
FIG. 1 shows schematically a group of containers stacked on the ground.

FIG. 1 shows a group 1 of containers. Containers 2 are arranged in parallel rows such as row 3. Containers in each row are piled on top of each other in stacks such as a stack 4, stack 7 and stack 8. Between each row 3 of containers is a clearance 5 and between each container 2 in a row 3 is a clearance 6.

Containers 2 may be piled up 8 or 9 containers high depending on the container handling yard. Clearance between rows and containers must be sufficient for a crane to lower a spreader or other lifting device between neighbouring stacks without physical interference. For example for a spreader to descend and land or pick up a container on a ground slot adjacent to stacks such as stacks 4, 7, and 8 in FIG. 1.

Figure 2:
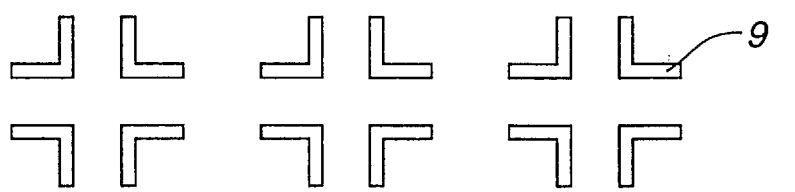
FIG. 2 shows a layout on the ground of a number of ground slots for containers.
Figure 2:
Figure 2:
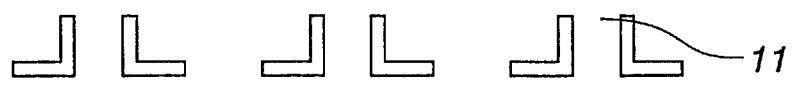
Figure 2:
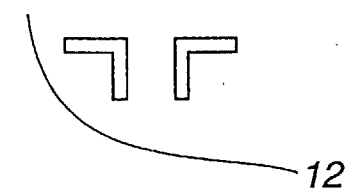
Figure 2:
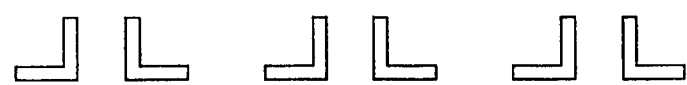

FIG. 2 shows schematically a number of rectangular ground slots laid out on a ground surface. Lines painted on the ground, typically such as a corner marks 9, define a ground slot 10. Each ground slot 10 is laid out with clearance 11 between rows and clearance 12 between containers. A ground slot such as ground slot 10 may be for a 20 ft container. A 40 ft container may also be placed on two 20 ft ground slots.

Figure 3:
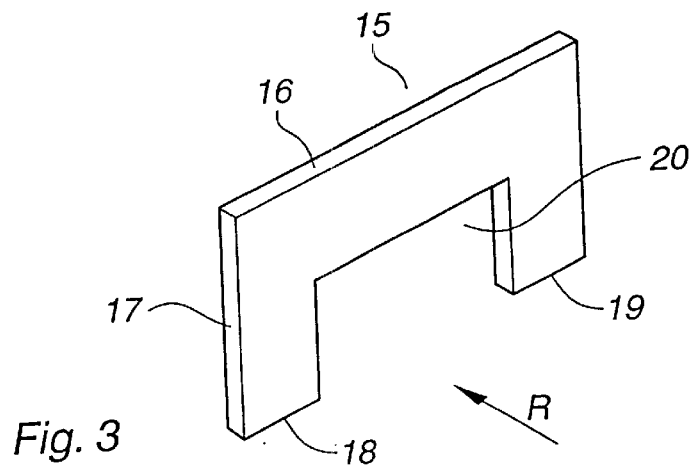
FIG. 3 shows schematically a horizontal reference marker according to the invention.

FIG. 3 shows a horizontal reference marker 15 according to the invention in the embodiment of a substantially rectangular elongated plate. The horizontal reference marker 15 has an elongated part indicated by the numeral 16 and a height dimension indicated by the numeral 17. The horizontal reference marker 15 is fixed perpendicular to the ground in this embodiment by two legs 18, 19. An opening 20 in the shape is present in this embodiment, which opening 20 has the function of reducing the amount of material required and also facilitating drainage of rainwater. The horizontal reference marker 15 is fixed to the ground and arranged in a known position relative to a ground slot.

The dimensions of horizontal reference markers are not limited except by practical considerations. A suitable length for detection by means such as laser beams is about 0.5 meters long for the dimension indicated by numeral 16. A suitable height for detection by means such as laser beams, in the dimension indicated by dimension 17, including during adverse weather conditions or poor lighting conditions, is about 25–30 centimeters high. A suitable material for the horizontal reference marker is steel plate, which may be simply bolted onto a concrete surface for example.

Horizontal reference markers according to the present invention may be arranged relative to one or more ground slots in a number of ways depending, for example, on the number of ground slots on the ground for any one group of containers. Given that the distance between each horizontal reference marker and an adjacent ground slot is predetermined, there is no limit to the number of ways in which one or more horizontal markers may be arranged relative to a ground slot. Each ground slot may be arranged with one or more horizontal reference markers dedicated to each particular ground slot. This would be a particular benefit when, for example, adjacent ground slots are placed on uneven ground with support surfaces at substantially different heights to one another. Horizontal reference markers may also be arranged in a standard formation around each ground slot with each marker being at a fixed distance from all of the nearest ground slots.

Figure 4:
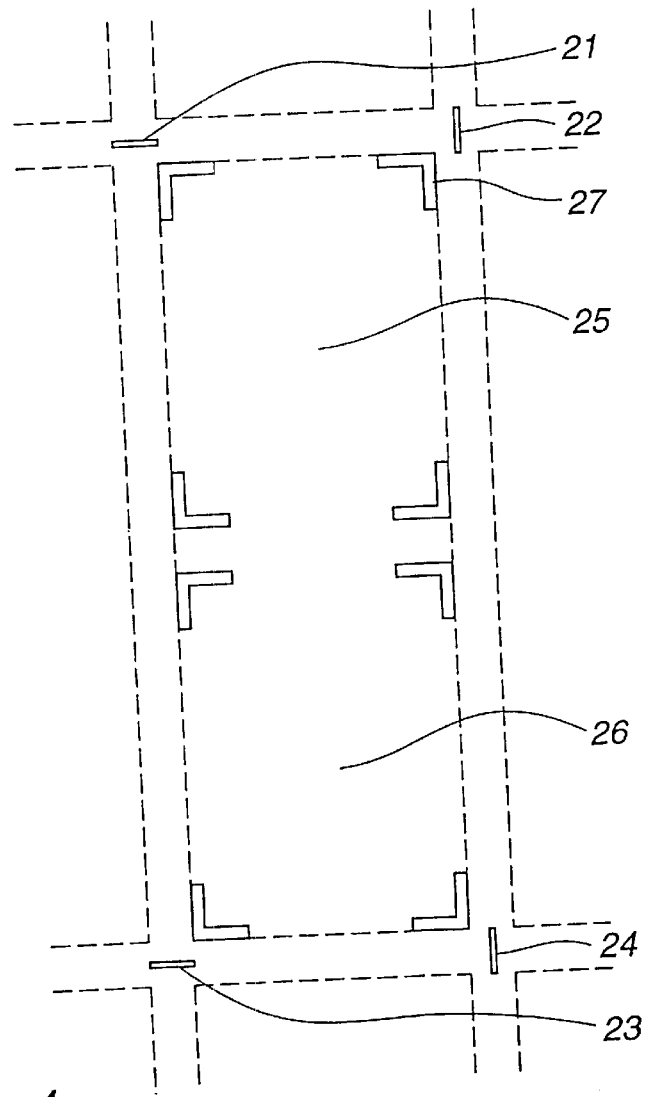
FIG. 4 shows schematically two 20 ft ground slots equipped with horizontal reference markers according to the invention.

FIG. 4 shows a preferred embodiment in which four reference markers 21–24 are arranged relative to two 20 ft ground slots 25, 26. Each 20 ft ground slot is shown marked on the ground by corner marks such as corner mark 27 painted on the ground.

It is to be understood that the number of horizontal reference markers relative to the number of ground slots may be selected depending on the ranges and viewing angles of the distance measuring means employed. For example, as indicated in FIG. 4, it may not be required to have a horizontal reference marker at each corner of a 20 ft ground slot.

In FIG. 4 horizontal reference markers 21–24 are placed in the intersections of clearances between containers and rows, in a position where line of sight would be least obstructed by containers and container stacks. Horizontal reference markers may also be located in any position in the clearances between container rows or containers.

The distance between one or more horizontal reference markers and the intended ground slot is known in advance. Such distance measurements known in advance may be stored in a data memory means or other memory means connected to the distance measurement sensors used. It is a routine matter for those skilled in the art of such distance measuring systems to convert the distance measured between a travelling part of the crane and a horizontal reference marker into a distance from the intended ground slot. A travelling part of a crane may, depending on the type of crane employed, be a spreader, a trolley or another suitable part that moves in the same directions in a horizontal plane as the load carrying part of the crane.

Using known measuring means such as laser arrangements suitably mounted in one or more locations on a crane, such as a travelling part of a crane, the exact location of a ground slot in a horizontal plane can be determined. Known laser arrangements include one or more sensors capable of producing scanning laser beams, laser beams and sensor combinations that are capable of detecting the edge of the horizontal reference marker.

A method according to the invention for measuring the distance between a travelling part on a crane and the ground slot is measured in stages. First the distance is measured between the travelling part of the crane and a horizontal reference marker arranged relative to the ground slot. Secondly, the known distance between the horizontal reference marker and the ground slot is taken, retrieved from memory means for example. Thirdly the known distance between horizontal reference marker and ground slot is used together with the measured distance from the travelling part of the crane and the horizontal reference marker, in order to calculate the distance between the travelling part of the crane and the ground slot. In this way the distance between the travelling part of a crane and the ground slot for a container on the ground may be measured accurately.

It will be understood from the above that measurements taken of two horizontal reference markers located in the same row, such as 22 and 24 in FIG. 4 for example, can be used to measure a skew alignment error in a horizontal plane between the travelling part of the crane and the ground slot.

A first measurement of distance from the travelling part of the crane to a first horizontal reference marker is compared to a second measurement of distance to a second horizontal reference marker. This comparison is used to provide a position of the travelling part of the crane, and thus the container. In other words, the comparison provides a measurement of any skew error of the long axis of the container in the horizontal plane with respect to the line of the row of containers.

What is claimed is:

1. A method for measuring a distance between a traveling part of a crane and one first side of a ground slot for a container with the use of at least two horizontal reference markers, wherein two or more horizontal reference markers are fixed perpendicular to a substantially horizontal surface and arranged in a known position relative to the first side of the ground slot for the container on said horizontal surface, and by the steps of:

measuring a first distance between the traveling part of a crane and a first horizontal reference marker;

measuring a second distance between the traveling part of the crane and a second horizontal reference marker; and calculating a distance between the traveling part of the crane and the first side of a ground slot for a container using the known distance between the first and second horizontal reference markers and the ground slot.

2. A method according to claim 1, further comprising the steps of:

calculating a third distance between the traveling part of the crane and the ground slot from the first distance and the known distance of the first reference marker from the ground slot;

calculating a fourth distance between the traveling part of the crane and the second distance and the know distance of the second reference marker from the ground slot;

comparing the third and fourth distances; and calculating a skew of the container in respect of the first side of the ground slot from the comparison of the third distance and the fourth distance.

3. A method according claim 1, further comprising the steps of;

measuring a distance between a traveling part of the crane and a third reference marker; and calculating from a known distance of the third reference marker from a second side of the ground slot the distance of the traveling part of the crane from the second side of the ground slot, which second side is perpendicular to the first side of the ground slot.

* * * * *